US011929038B2

(12) United States Patent
Hong

(10) Patent No.: US 11,929,038 B2
(45) Date of Patent: Mar. 12, 2024

(54) DISPLAY DEVICE, DATA DRIVING CIRCUIT, AND DISPLAY DRIVING METHOD

(71) Applicant: LG DISPLAY CO., LTD., Seoul (KR)

(72) Inventor: MooKyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/864,802

(22) Filed: Jul. 14, 2022

(65) Prior Publication Data

US 2023/0049523 A1 Feb. 16, 2023

(30) Foreign Application Priority Data

Aug. 13, 2021 (KR) ........................ 10-2021-0107193

(51) Int. Cl.
*G09G 3/3291* (2016.01)
*G09G 3/00* (2006.01)
*G09G 3/3233* (2016.01)
*G09G 3/3266* (2016.01)

(52) U.S. Cl.
CPC ........... *G09G 3/3291* (2013.01); *G09G 3/006* (2013.01); *G09G 3/3233* (2013.01); *G09G 3/3266* (2013.01); *G09G 2300/0452* (2013.01); *G09G 2300/0819* (2013.01); *G09G 2300/0842* (2013.01); *G09G 2310/061* (2013.01); *G09G 2310/08* (2013.01); *G09G 2320/0233* (2013.01); *G09G 2320/0247* (2013.01); *G09G 2330/021* (2013.01)

(58) Field of Classification Search
CPC .... G09G 3/3291; G09G 3/006; G09G 3/3233; G09G 3/3266; G09G 2300/0452; G09G 2300/0819; G09G 2300/0842; G09G 2310/061; G09G 2310/08; G09G 2320/0233; G09G 2320/0247; G09G 2330/021
See application file for complete search history.

(56) References Cited

U.S. PATENT DOCUMENTS

2016/0125811 A1* 5/2016 Park ..................... G09G 3/3258 345/694
2018/0061292 A1* 3/2018 Hong ................... G09G 3/3233
2019/0385525 A1* 12/2019 Jin ....................... G09G 3/3208
2021/0264834 A1* 8/2021 Lee .......................... G09G 3/20

* cited by examiner

*Primary Examiner* — Kenneth B Lee, Jr.
(74) *Attorney, Agent, or Firm* — POLSINELLI PC

(57) ABSTRACT

A display device includes a display panel, a data driving circuit, and a timing controller, wherein the display panel includes a plurality of gate lines to which a scan signal is applied, a plurality of data lines to which a data voltage is applied, a plurality of reference voltage lines to which a reference voltage is applied, and a plurality of subpixels, wherein the data driving circuit senses a voltage on one reference voltage line selected from the plurality of reference voltage lines in a first detecting period and a second detecting period having different voltage detecting paths, and wherein the timing controller controls the data driving circuit, and determining whether or not the reference voltage line is abnormal using a sensing voltage detected from the reference voltage line.

17 Claims, 13 Drawing Sheets

DISPLAY DEVICE, DATA DRIVING CIRCUIT, AND DISPLAY DRIVING METHOD

CROSS-REFERENCE TO RELATED APPLICATION

This application claims the priority of Korean Patent Application No. 10-2021-0107193, filed on Aug. 13, 2021, which is hereby incorporated by reference in its entirety.

BACKGROUND

Field of the Disclosure

The present disclosure relates to a display device, a data driving circuit, and a display driving method that can improve accuracy in sensing and compensating for characteristic values of a driving transistor.

Description of the Background

In response to the development of the information society, demand for display devices displaying images is increasing. In this regard, various types of display devices, such as a liquid crystal display (LCD) and an organic light-emitting display, are used.

The organic light-emitting display among such display devices is advantageous in terms of response rate, contrast ratio, emission efficiency, luminous intensity, and viewing angle, since a self-emitting light-emitting diode (LED) is used therein.

Such an organic light-emitting display includes a plurality of LEDs each disposed in a corresponding subpixel among a plurality of subpixels disposed in a display panel. The organic light-emitting display may display images while controlling luminous intensity of each of the subpixels by allowing the LEDs to generate light by controlling current flowing through the LEDs.

An LED and a driving transistor for driving the LED to generate light are disposed in each of the subpixels defined in the display panel. Characteristic values, such as a threshold voltage or mobility, of the transistor in each of the subpixels may change over the driving time, or the driving transistors may have a deviation of the characteristic values due to the difference in the driving time between the subpixels. Thus, a luminance deviation (or non-uniform luminance) may occur among the subpixels, thereby lowering image quality.

Thus, in order to overcome the luminance deviation among the subpixels, a technology for sensing and compensating characteristic values, such as the threshold voltage or mobility, of the driving transistor has been used.

However, when a defect such as moisture penetration, an impurity, or a short circuit, occurs in a reference voltage line for sensing characteristic values of the driving transistor, an error occurs in a sensing voltage for the characteristic values, and thus effective sensing or compensation operation cannot be properly performed, which is problematic.

SUMMARY

Accordingly, the present disclosure is to provide a display device, a data driving circuit, and a display driving method that can diminish errors in the sensing operation of characteristic values of a driving transistor.

More specifically, the present disclosure is to provide a display device, a data driving circuit, and a display driving method that can diminish errors in the sensing operation of characteristic values of a driving transistor by performing a defect detecting operation on a reference voltage line before the sensing operation of characteristic values of a driving transistor.

The present disclosure is also to provide a display device, a data driving circuit, and a display driving method that can improve the accuracy in sensing and compensating for characteristic values of a driving transistor by previously determining whether or not a reference voltage line is abnormal.

The present disclosure is also to provide a display device, a data driving circuit, and a display driving method that can determine whether or not a reference voltage line is abnormal depending on a deviation of sensing voltages by varying voltage detecting paths for a single reference voltage line and effectively sensing and compensating characteristic values of a driving transistor on the basis of the determination.

The present disclosure is also to provide a display device, a data driving circuit, and a display driving method that can effectively perform an offset compensation for an analog-to-digital converter of the data driving circuit on the basis of a sensing voltage detected through a reference voltage line.

In an aspect of the present disclosure, a display device includes a display panel in which a plurality of gate lines to which a scan signal is applied, a plurality of data lines to which a data voltage is applied, a plurality of reference voltage lines to which a reference voltage is applied, and a plurality of subpixels are disposed; a data driving circuit configured to sense a voltage on one reference voltage line selected from the plurality of reference voltage lines in a first detecting period and a second detecting period having different voltage detecting paths; and a timing controller configured to control the data driving circuit and determine whether or not the reference voltage line is abnormal using a sensing voltage detected from the reference voltage line.

In another aspect of the present disclosure, a data driving circuit includes an analog-to-digital converter configured to sense a voltage on a reference voltage line electrically connected to a source node of a driving transistor disposed in a display panel in a first detecting period and a second detecting period having different voltage detecting paths; a data output circuit configured to convert digital image data transferred through a timing controller to an analog data voltage, and supply the analog data voltage to a corresponding subpixel through a plurality of data lines; and a sampling switch configured to control on and off states of the reference voltage line.

In a further aspect of the present disclosure, a display driving method of a display device including a plurality of data lines extending to a display panel in which a plurality of subpixels are disposed to supply a data voltage and a reference voltage line electrically connected to a source node of a driving transistor disposed in the display panel, the method includes applying a display-driving reference voltage to the reference voltage line; sensing a voltage on the reference voltage line through a first path in a first detecting period; blocking the display-driving reference voltage; sensing a voltage on the reference voltage line through a second path in a second detecting period; determining whether or not the reference voltage line is abnormal by comparing the voltage sensed in the first detecting period and the voltage sensed in the second detecting period; sensing characteristic values when the reference voltage line is not abnormal; and when the reference voltage line is abnormal, stopping the sensing operation of the characteristic values or compensating for the characteristic values using a voltage sensed from an adjacent reference voltage line.

The display device, the data driving circuit, and the display driving method of the present disclosure can diminish errors in the sensing operation of characteristic values of a driving transistor.

The display device, the data driving circuit, and the display driving method of the present disclosure can diminish errors in the sensing operation of characteristic values of a driving transistor by performing a defect detecting operation on a reference voltage line before the sensing operation of characteristic values for a driving transistor.

The display device, the data driving circuit, and the display driving method of the present disclosure can the accuracy of the sensing and compensating operation of characteristic values for a driving transistor by previously determining whether or not a reference voltage line is abnormal.

The display device, the data driving circuit, and the display driving method of the present disclosure can determine whether or not a reference voltage line is abnormal depending on a deviation of sensing voltages by varying voltage detecting paths for a single reference voltage line, and effectively sense and compensate for characteristic values of a driving transistor on the basis of the determination.

The display device, the data driving circuit, and the display driving method of the present disclosure can effectively perform an offset compensation for an analog-to-digital converter of the data driving circuit on the basis of a sensing voltage detected through a reference voltage line.

BRIEF DESCRIPTION OF THE DRAWINGS

The above and other objectives, features, and advantages of the present disclosure will be more clearly understood from the following detailed description, taken in conjunction with the accompanying drawings, in which.

DETAILED DESCRIPTION

Figure 1:
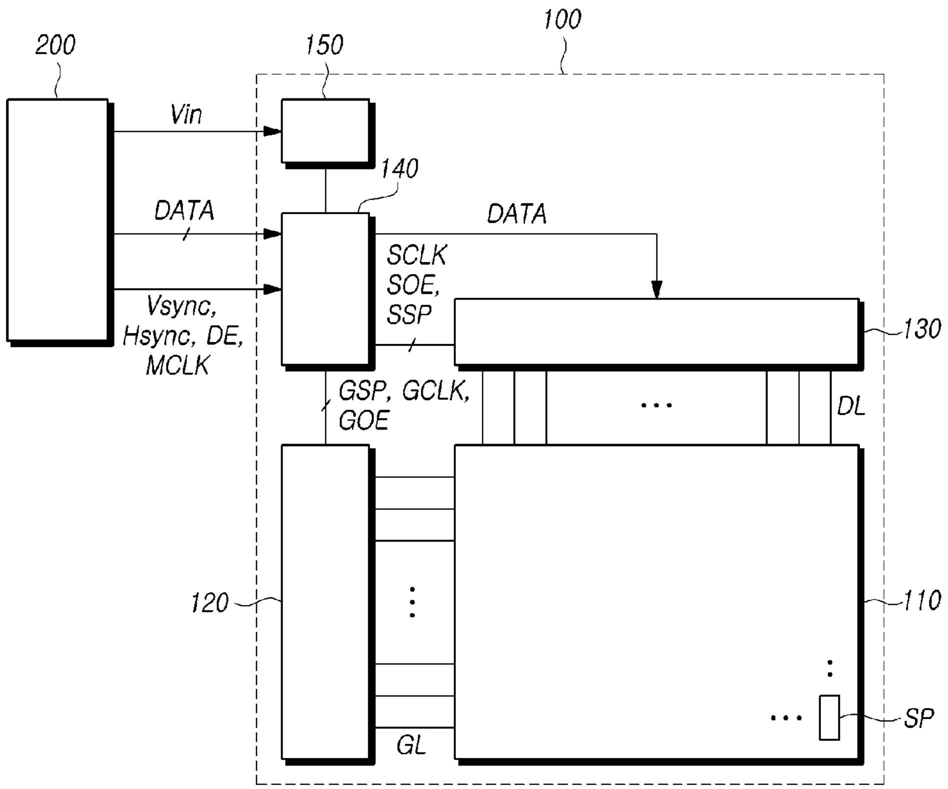
FIG. 1 illustrates a schematic configuration of a display device according to aspects of the present disclosure.

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as “including”, “having”, “containing”, “constituting”, “made up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements, etc., but is used merely to distinguish the corresponding element from other elements.

When it is mentioned that a first element “is connected or coupled to”, “contacts or overlaps”, etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes, etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the present disclosure will be described in detail with reference to the accompanying drawings.

FIG. 1 illustrates a schematic configuration of a display device according to aspects of the present disclosure.

Referring to FIG. 1, a display device 100 according to aspects of the present disclosure may include a display panel 110 to which a plurality of gate lines GL and a plurality of data lines DL are connected and in which a plurality of subpixels SP are arranged in the form of a matrix, a gate driving circuit 120 configured to drive the plurality of gate lines GL, a data driving circuit 130 configured to supply data voltages through the plurality of data lines DL, a timing controller 140 configured to control the gate driving circuit 120 and the data driving circuit 130, and a power management circuit 150.

The display panel 110 displays an image on the basis of a scan signal transferred from the gate driving circuit 120 through the plurality of gate lines GL and a data voltage transferred from the data driving circuit 130 through the plurality of data lines DL.

In a liquid crystal display (LCD), the display panel 110 includes a liquid crystal layer sandwiched between two substrates. The display panel 110 may operate in any of known modes, such as twisted nematic (TN) mode, vertical alignment (VA) mode, in-plane switching (IPS) mode, and fringe field switching (FFS) mode. In contrast, an organic light-emitting display or an organic light-emitting diode (OLED) display may be implemented as a top emission display, a bottom emission display, a dual emission display, or the like.

In the display panel 110, a plurality of pixels may be arranged in the form of a matrix. Each of the pixels includes subpixels SP having different colors, e.g., a white subpixel, a red subpixel, a green subpixel, and a blue subpixel. Respective subpixels SP may be defined by the plurality of data lines DL and the plurality of gate lines GL.

A single subpixel SP may include a thin-film transistor (TFT) provided in a region in which a single data line DL and a single gate line GL intersect each other, an emitting device such as an OLED to be charged with a data voltage, a storage capacitor electrically connected to the emitting device to maintain the voltage, and the like.

For example, when each of the pixels of the display device 100 having 2,160×3,840 resolution is comprised of 4 subpixels SP including a white subpixel W, a red subpixel R, a green subpixel G, and a blue subpixel B, 2,160 gate lines GL may be provided, and since each of 3,840 data lines DL is connected to 4 subpixels SP, a 15,360 data lines DL may be provided, where 15,360=3,840×4. The subpixel SP will be disposed at points at which the gate lines GL intersect the data lines DL, respectively.

The gate driving circuit 120 is controlled by the controller 140, and controls drive timing of the plurality of subpixels SP by sequentially outputting scan signals to the plurality of gate lines GL disposed in the display panel 110.

In the display device 100 having 2,160×3,840 resolution, an operation of sequentially outputting scan signals to the 2,160 gate lines GL, in the order from the first gate line GL to the 2,160th gate line GL, may be referred to as 2,160 phase driving operation. Alternatively, an operation of sequentially outputting scan signals in units of 4 gate lines GL like an operation of sequentially outputting scan signals to the gate lines, in the order from the first gate line to the fourth gate line, and then in the order from the fifth gate line to the eighth gate line, will be referred to as 4 phase driving operation. That is, an operation of sequentially outputting scan signals for every N number of gate lines GL may be referred to as N phase driving operation.

Here, the gate driving circuit 120 may include one or more gate driving integrated circuits (GDICs), and be positioned on one side or both sides of the display panel 110 depending on the driving method. Alternatively, the gate driving circuit 120 may be implemented as a gate-in-panel (GIP) structure in which the gate driving circuit 120 is embedded in a bezel area of the display panel 110.

The data driving circuit 130 receives image data DATA from the timing controller 140, and converts the received image data DATA to analog data voltages. Afterwards, the data driving circuit 130 outputs the data voltages to respective data lines DL at points in time when the scan signals are applied through the gate lines GL, so that the subpixels SP connected to the data lines DL display emission signals having brightness matching the data voltages.

In the same manner, the data driving circuit 130 may include one or more source driving integrated circuits (SDICs). The source driving integrated circuits may be connected to bonding pads of the display panel 110 or directly disposed on the display panel 110 by a tape automated bonding method or a chip-on-glass (COG) method.

In some cases, each of the source driving integrated circuits may be disposed on and integrated with the display panel 110. In addition, each of the source driving integrated circuits may be implemented using a chip-on-film (COF) structure. In this case, each of the source driving integrated circuits may be mounted on a circuit film to be electrically connected to a corresponding data line DL of the display panel 110 through the circuit film.

The timing controller 140 sends a variety of control signals to the gate driving circuit 120 and the data driving circuit 130, and controls the operations of the gate driving circuit 120 and the data driving circuit 130. That is, the timing controller 140 controls the gate driving circuit 120 to output scan signals at points in time defined for respective frames, and on the other hand, transfers the image data DATA received from an external source to the data driving circuit 130.

Here, the timing controller 140 receives a variety of timing signals, such as a vertical synchronization signal Vsync, a horizontal synchronization signal Hsync, a data enable (DE) signal, and a main clock (MCLK) signal, in addition to the image data, from an external host system 200.

The host system 200 may be one of a television (TV) system, a set-top box, a navigation system, a personal computer (PC), a home theater system, a mobile device, and a wearable device.

Thus, the timing controller 140 generates control signals using a variety of timing signals received from the host system 200, and transfers the control signals to the gate driving circuit 120 and the data driving circuit 130.

For example, the timing controller 140 outputs a variety of gate control signals including a gate start pulse signal GSP, a gate clock signal GCLK, a gate output enable signal GOE, and the like in order to control the gate driving circuit 130. Here, the gate start pulse signal GSP controls a point in time when one or more gate driving integrated circuits of the gate driving circuit 120 starts to operate. In addition, the gate clock signal GCLK is a clock signal input in common to one or more gate driving integrated circuits to control shift timing of scan signals. In addition, the gate output enable signal GOE designates timing information of one or more gate driving integrated circuits.

In addition, the timing controller 140 outputs a variety of data control signals including a source start pulse signal SSP, a source sampling clock signal SCLK, a source output enable signal SOE, and the like in order to control the data driving circuit 130. Here, the source start pulse signal SSP controls a point in time when the one or more source driving integrated circuits of the data driving circuit 130 start data sampling. The source sampling clock signal SCLK is a clock signal controlling a point in time when the source driving integrated circuits sample data. The source output enable signal SOE controls a point in time when the data driving circuit 130 outputs data.

The display device 100 may include the power management circuit 150 to supply a variety of voltages to the display panel 110, the gate driving circuit 120, the data driving circuit 130, and the like, or control a variety of voltages or currents to be supplied to the components (e.g., 110, 120, and 130).

The power management circuit 150 generates power necessary for the operation of the display panel 110, the gate driving circuit 120, and the data driving circuit 130 by adjusting a DC input voltage Vin supplied by the host system 200.

In addition, the subpixels SP are positioned at points at which the gate lines GL intersect the data lines DL, and an emitting device may be disposed in each of the subpixels SP. For example, the organic light-emitting display includes emitting devices, such as LEDs, each disposed in a corresponding subpixel among the subpixels SP. The organic light-emitting display may display images by controlling current flowing through the emitting device according to data voltages.

The display device 100 may be one of various types of devices, such as an LCD, an organic light-emitting display, and a plasma display panel.

Figure 2:
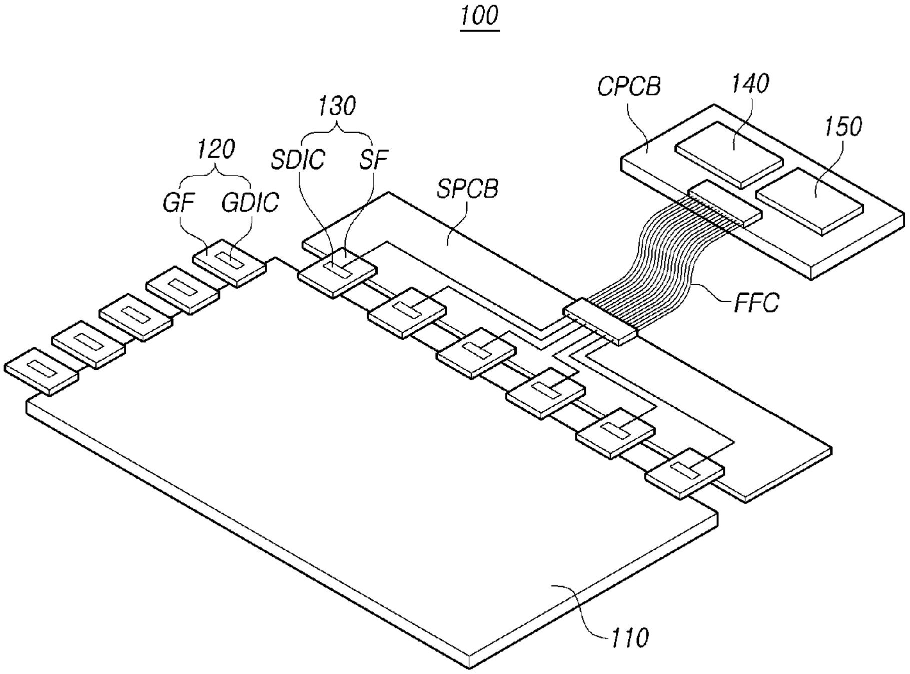
FIG. 2 illustrates an example system of the display device according to aspects of the present disclosure.

FIG. 2 illustrates an example system of the display device according to aspects of the present disclosure.

Referring to FIG. 2, in the display device 100 according to aspects of the present disclosure, the source driving integrated circuits SDIC of the data driving circuit 130 and the gate driving integrated circuits GDIC of the gate driving circuit 120 are illustrated as being implemented by the COF method among a variety of methods (e.g., the TAB, COG, and COF methods) as an example.

The one or more gate driving integrated circuits of the gate driving circuit 120 may be mounted on gate films GF, respectively. One side of each of the gate films GF may be electrically connected to the display panel 110. In addition, wires for electrically connecting the gate driving integrated circuits GDIC and the display panel 110 may be disposed on top of the gate films GF.

Likewise, the one or more source driving integrated circuits SDIC of the data driving circuit 130 may be mounted on source films SF, respectively. One side of each of the source films SF may be electrically connected to the display panel 110. In addition, wires for electrically connecting the source driving integrated circuits SDIC and the display panel 110 may be disposed on top of the source films SF.

For the plurality of source driving integrated circuits SDIC to be circuit-connected to other devices, the display device 100 may include at least one source printed circuit board SPCB and a control printed circuit board CPCB allowing control components and a variety of electrical devices to be mounted thereon.

Here, the other sides of the source films SF, on which the source driving integrated circuits SDIC are mounted, may be connected to the at least one source printed circuit board SPCB. That is, each of the source films SF, on which the source driving integrated circuits SDIC are mounted, may be configured such that one side is electrically connected to the display panel 110 and the other side is electrically connected to the source printed circuit board SPCB.

The timing controller 140 and the power management circuit 150 may be mounted on the control printed circuit board CPCB. The timing controller 140 may control operations of the data driving circuit 130 and the gate driving circuit 120. The power management circuit 150 may supply driving voltages or current to the display panel 110, the gate driving circuit 120, the data driving circuit 130, and the like, or control a variety of voltages or currents to be supplied to the components (e.g., 110, 120, and 130).

The at least one source printed circuit board SPCB and the control printed circuit board CPCB may be circuit-connected to each other through at least one connecting member. The connecting member may be, for example, a flexible flat cable FFC. Alternatively, the connecting member may be a flexible printed circuit (FPC) or the like. Here, the connecting member connecting the at least one source printed circuit board SPCB and the control printed circuit board CPCB may be variously modified according to the size and type of the display device 100. In addition, the at least one source printed circuit board SPCB and the control printed circuit board CPCB may be integrated into a single printed circuit board (PCB).

In the display device 100 having the above-described configuration, the power management circuit 150 transfers driving voltages required for display driving or characteristic value sensing to the source printed circuit board SPCB through the flexible flat cable FFC or the flexible printed circuit (FPC). Driving voltages transferred to the source printed circuit board SPCB are supplied to specific subpixels SP in the display panel 110 through the source driving integrated circuits SDIC in order to allow the specific subpixels SP to emit light or sense the specific subpixels SP.

Here, each of the subpixels SP arranged in the display panel 110 of the display device 100 may include circuit devices, such as an organic light-emitting diode (OLED) serving as an emitting device and a driving transistor for driving the OLED.

The types and number of the circuit devices of each of the subpixels SP may be determined variously depending on the function provided, the design, and the like.

Figure 3:
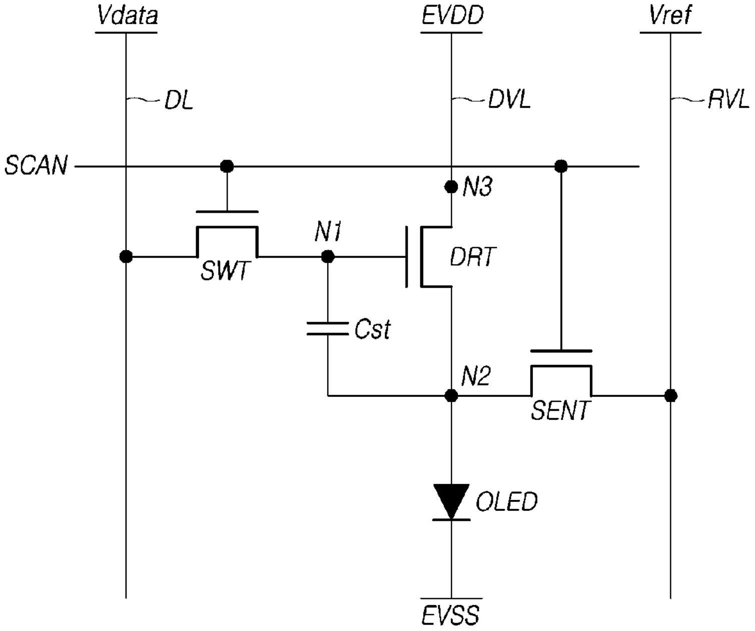
FIG. 3 illustrates an example of a circuit of a subpixel in the display device according to aspects of the present disclosure.

FIG. 3 illustrates an example of a circuit of a subpixel in the display device according to aspects of the present disclosure.

Referring to FIG. 3, in the display device 100 according to aspects of the present disclosure, a subpixel SP may include one or more transistors and a capacitor. In the subpixel SP, an organic light-emitting diode OLED may be disposed as a light-emitting element.

For example, the subpixel SP may include a driving transistor DRT, a switching transistor SWT, a sensing transistor SENT, a storage capacitor Cst, and the organic light-emitting diode OLED.

The driving transistor DRT has a first node N1, a second node N2, and a third node N3. The first node N1 of the driving transistor DRT may be a gate node to which a data voltage Vdata is applied from the data driving circuit 130 through a data line DL when the switching transistor SWT is turned on. The second node N2 of the driving transistor DRT may be electrically connected to an anode of the organic light-emitting diode OLED, and be a source node or a drain node. The third node N3 of the driving transistor DRT may be electrically connected to a driving voltage line DVL to which a subpixel driving voltage EVDD is applied, and be a drain node or a source node.

Here, during a display driving period, the subpixel driving voltage EVDD required for displaying an image may be supplied through the driving voltage line DVL. For example, the subpixel driving voltage EVDD required for displaying an image may be 27 V.

The switching transistor SWT is electrically connected to the first node N1 of the driving transistor DRT and the data line DL. The switching transistor SWT operates in response to a scan signal SCAN transferred through a gate line GL connected to a gate node of the switching transistor SWT. In addition, when the switching transistor SWT is turned on, the data voltage Vdata supplied through the data line DL is transferred to the gate node of the driving transistor DRT, thereby controlling the operation of the driving transistor DRT.

The sensing transistor SENT is electrically connected to the second node N2 of the driving transistor DRT and a reference voltage line RVL, and operates in response to a sensing signal SENSE provided through the gate line GL connected to the gate node of the sensing transistor SENT. When the sensing transistor SENT is turned on, a sensing reference voltage Vref supplied through the reference voltage line RVL is transferred to the second node N2 of the driving transistor DRT.

That is, voltages on the first node N1 and the second node N2 of the driving transistor DRT may be controlled by controlling the switching transistor SWT and the sensing transistor SENT. Consequently, a current for driving the organic light-emitting diode OLED may be supplied.

The gate node of the switching transistor SWT and the gate node of the sensing transistor SENT may be connected to a single gate line GL or different gate lines GL. Herein, a structure by which the switching transistor SWT and the sensing transistor SENT are connected to different gate lines GL is illustrated as an example. In this case, the switching transistor SWT and the sensing transistor SENT may be independently controlled by the scan signal SCAN and the sensing signal SENSE transferred through the different gate lines GL.

In contrast, when the switching transistor SWT and the sensing transistor SENT are connected to a single gate line GL, the switching transistor SWT and the sensing transistor SENT may be simultaneously controlled by the scan signal SCAN and the sensing signal SENSE transferred through the single gate line GL. The aperture ratio of the subpixel SP may be increased.

In addition, each of the transistors disposed in the subpixel SP may be an N-type transistor or a P-type transistor. Herein, each of the transistors is illustrated as being an N-type transistor by way of example.

The storage capacitor Cst is electrically connected to the first node N1 and the second node N2 of the driving transistor DRT, and maintains the data voltage Vdata for a one-frame period.

The storage capacitor Cst may be electrically connected to the first node N1 and the third node N3 of the driving transistor DRT depending on the type of the driving transistor DRT. An anode of the organic light-emitting diode OLED may be electrically connected to the second node N2 of the driving transistor DRT, and a base voltage EVSS may be applied to a cathode of the organic light-emitting diode OLED.

Here, the base voltage EVSS may be a ground voltage or a voltage higher or lower than the ground voltage. In addition, the base voltage EVSS may vary depending on the driving state. For example, the base voltage EVSS at a point in time when display driving is performed and the base voltage EVSS at a point in time when sensing driving is performed may set differently from each other.

The above-described structure of the subpixel SP may be a 3T1C structure comprised of 3 transistors and 1 capacitor, but is only an example for illustration. The structure of the subpixel SP may further include one or more transistors or, in some cases, may further include one or more capacitors. Alternatively, the plurality of subpixels SP may have the same structure, or some of the plurality of subpixels SP may have a different structure.

The display device 100 according to aspects may use a method of measuring a flowing current using a voltage with which the storage capacitor Cst is charged during a period in which characteristic values of the driving transistor DRT are sensed in order to effectively sense the characteristic values (e.g., the threshold voltage or mobility) of the driving transistor DRT. This method may be referred to as a current sensing method.

That is, by measuring the flowing current using the voltage with which the storage capacitor Cst is charged during the period in which characteristic values of the driving transistor DRT are sensed, characteristic values or changes in characteristic values of the driving transistor DRT in the subpixel SP may be determined.

Here, the reference voltage line RVL serves not only to transfer the reference voltage Vref but also as a sensing line to sense characteristic values of the driving transistor DRT in the subpixel SP. Thus, the reference voltage line RVL may also be referred to as a sensing line.

Figure 4:
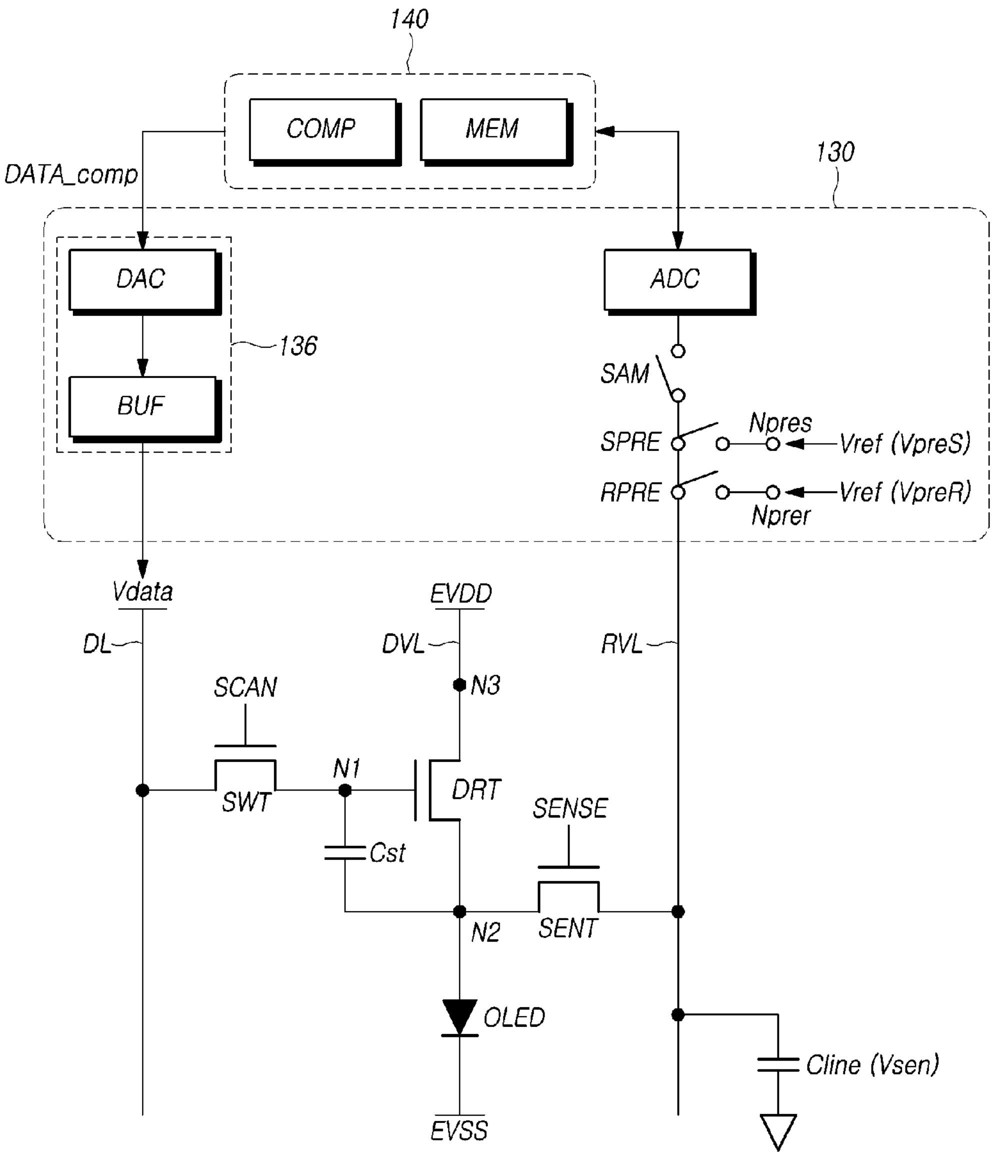
FIG. 4 illustrates an example circuit structure for sensing characteristic values of a driving transistor in the display device according to aspects of the present disclosure.

FIG. 4 illustrates an example circuit structure for sensing characteristic values of a driving transistor in the display device according to aspects of the present disclosure.

Referring to FIG. 4, the display device 100 according to aspects of the present disclosure may include components for compensating for a deviation of characteristic values of the driving transistor DRT.

For example, in a sensing period of the display device 100, characteristic values or changes in characteristic values of the driving transistor DRT may be reflected as a voltage (e.g., Vdata-Vth) on the second node N2 of the driving transistor DRT.

When the sensing transistor SENT is in a turned-on state, the voltage on the second node N2 of the driving transistor DRT may correspond to a voltage on the reference voltage line RVL. In addition, a line capacitor Cline on the reference voltage line RVL may be charged with the voltage on the second node N2 of the driving transistor DRT. Due to a sensing voltage Vsen with which the line capacitor Cline is charged, the reference voltage line RVL may have a voltage corresponding to the voltage on the second node N2 of the driving transistor DRT.

The display device 100 may include an analog-to-digital converter ADC to sense the voltage on the reference voltage line RVL corresponding to the voltage on the second node N2 of the driving transistor DRT and convert the sensing voltage to digital data and a switch circuit SAM and SPRE to sense characteristic values of the driving transistor DRT.

The switch circuit SAM and SPRE for controlling sensing driving may include a sensing reference switch SPRE to control a connection between each reference voltage line RVL and a sensing reference voltage node Npres to which a reference voltage Vref is supplied and a sampling switch SAM to control a connection between each reference voltage line RVL and the analog-to-digital converter ADC.

Here, the sensing reference switch SPRE is a switch configured to control a sensing driving operation. Due to the sensing reference switch SPRE, the reference voltage Vref supplied through the reference voltage line RVL forms a sensing reference voltage VpreS.

In addition, the switch circuit for sensing characteristic values of the driving transistor DRT may include a display-driving reference switch RPRE to control a display-driving operation. The display-driving reference switch RPRE may control a connection between each reference voltage line RVL and a display-driving reference voltage node Nprer to which a reference voltage Vref is supplied.

The display-driving reference switch RPRE is a switch used in the display-driving operation, and the reference voltage Vref supplied through the reference voltage line RVL by the display-driving reference switch RPRE corresponds to a display-driving reference voltage VpreR.

Here, the sensing reference switch SPRE and the display-driving reference switch RPRE may be provided separately or integrated into a single switch. The sensing reference voltage VpreS and the display-driving reference voltage VpreR may be the same voltage value or different voltage values.

The timing controller 140 of the display device 100 may include a memory MEM and a compensation circuit COMP. In the memory MEM, data transferred from the analog-to-digital converter ADC is stored, or reference values are previously stored. The compensation circuit COMP compares received data with the reference values stored in the memory MEM and compensates for a deviation of characteristic values. Here, a compensated value calculated by the compensation circuit COMP may be stored in the memory MEM.

Thus, the timing controller 140 may compensate for image data to be transferred to the data driving circuit 130 using the compensation values calculated by the compensation circuit COMP, and output compensated digital image data DATA_comp to the data driving circuit 130.

Consequently, the data driving circuit 130 may convert the compensated digital image data DATA_comp to a data voltage Vdata in the form of an analog signal by a digital-to-analog converter DAC, and output the converted data voltage Vdata to a corresponding data line DL by an output buffer BUF. As a result, a deviation of characteristic values (e.g., a threshold voltage deviation or a mobility deviation) of the driving transistor DRT in the corresponding subpixel SP may be compensated for.

Meanwhile, the data driving circuit 130 may include a data voltage output circuit 136 including a latch circuit, the digital-to-analog converter DAC, the output buffer BUF, and the like. In some cases, the data driving circuit 130 may further include the analog-to-digital converter ADC and the variety of switches SAM, SPRE, and RPRE. In contrast, the analog-to-digital converter ADC and the variety of switches SAM, SPRE, and RPRE may be positioned outside the data driving circuit 130.

In addition, although the compensation circuit COMP is provided outside the timing controller 140, the compensation circuit COMP may be provided inside the timing controller 140. The memory MEM may be positioned outside the timing controller 140 or inside the timing controller 140 in the form of a register.

Figure 5:
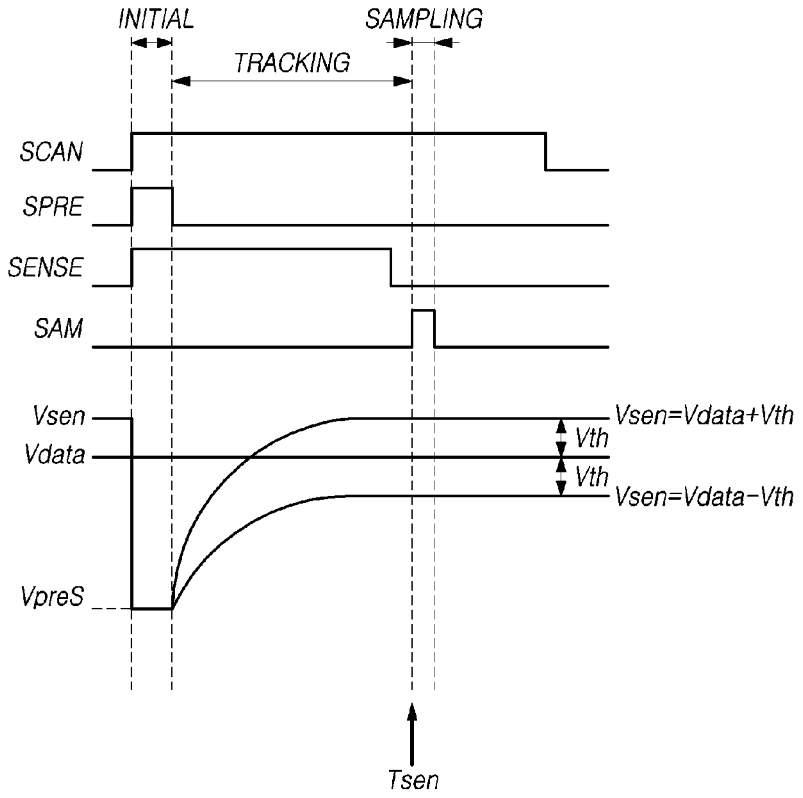
FIG. 5 is a signal timing diagram illustrating the sensing of a threshold voltage among characteristic values of a driving transistor in the display device according to aspects of the present disclosure.

FIG. 5 is a signal timing diagram illustrating the sensing of a threshold voltage among characteristic values of a driving transistor in the display device according to aspects of the present disclosure.

Referring to FIG. 5, a process of sensing characteristic values of a driving transistor in the display device 100 according to aspects of the present disclosure may include an initialization operation INITIAL, a tracking operation TRACKING, and a sampling operation SAMPLING.

In FIG. 5, a situation of sensing the threshold voltage Vth of the driving transistor DRT by respectively turning on or off the switching transistor SWT and the sensing transistor SENT is illustrated. In this case, a sensing operation may be performed by applying a scan signal SCAN and a sensing signal SENSE to the switching transistor SWT and the sensing transistor SENT through 2 gate lines GL.

In contrast, the threshold voltage Vth of the driving transistor DRT may be sensed by simultaneously turning on or off the switching transistor SWT and the sensing transistor SENT.

In the initialization operation INITIAL, the switching transistor SWT is switched to a turned-on state by a scan signal SCAN having a turn-on level, and the first node N1 of the driving transistor DRT is initialized with a data voltage Vdata for the sensing of the threshold voltage. In addition, the sensing transistor SENT is turned on by a sensing signal SENSE having a turn-on level, and the sensing reference switch SPRE is turned on. In this state, the second node N2 of the driving transistor DRT is initialized with a sensing reference voltage VpreS.

The tracking operation TRACKING is an operation of tracking the threshold voltage of the driving transistor DRT. In the tracking operation TRACKING, the scan signal SCAN having a turn-on level is maintained, and the sensing reference switch SPRE is transited to a turned-off level. Thus, the second node N2 of the driving transistor DRT is floated, thereby causing the voltage on the second node N2 of the driving transistor DRT to increase. In particular, since the voltage on the second node N2 of the driving transistor DRT is initialized with the sensing reference voltage VpreS, the voltage on the second node N2 of the driving transistor DRT starts to increase from the sensing reference voltage VpreS. At this time, since the sensing transistor SENT is turned on, the increase in the voltage on the second node N2 of the driving transistor DRT leads to an increase in the voltage on the reference voltage line RVL.

The voltage on the second node N2 of the driving transistor DRT increases until the difference between the voltage on the second node N2 and the data voltage Vdata is equal to the threshold voltage Vth. That is, the difference between the voltage on the second node N2 of the driving transistor DRT and the data voltage Vdata is equal to the threshold voltage Vth (i.e., Vsen is Vdata−Vth or Vdata+Vth), the voltage on the second node N2 of the driving transistor DRT is saturated.

At a sensing time Tsen after a predetermined time has passed from a point in time when the voltage on the second node N2 of the driving transistor DRT starts to increase in the sampling operation SAMPLING, the sampling switch SAM is turned on. Here, the analog-to-digital converter ADC may detect a voltage on the reference voltage line RVL connected through the sampling switch SAM, i.e., the sensing voltage Vsen formed on both ends of the line capacitor Cline, and convert the sensing voltage Vsen to a sensing value in the form of a digital signal.

Here, the sensing time Tsen when the sampling switch SAM is turned on to sense a change in the threshold voltage of the driving transistor DRT is determined to be a point in time when the sensing voltage Vsen is fully saturated and a voltage Vgs between the gate node and the source node of the driving transistor DRT approaches 0. The sensing time Tsen may be a point in time when a time of 30 to 40 ms has passed after the start of the tracking operation TRACKING.

The compensation circuit COMP may determine the threshold voltage Vth of the driving transistor DRT in a corresponding subpixel SP on the basis of the sensing value output from the analog-to-digital converter ADC, thereby compensating for a deviation of the driving transistor DRT.

As described above, sensing the voltage on the reference voltage line RVL, i.e., the voltage Vsen formed on both ends of the line capacitor Cline, by the analog-to-digital converter ADC may be the same as sensing the voltage on the second node N2 of the driving transistor DRT.

When the analog-to-digital converter ADC detects the sensing voltage Vsen, the threshold voltage Vth of the driving transistor DRT may be obtained, since the data voltage Vdata is a known value.

As described above, the sensing period of the characteristic values (e.g., the threshold voltage and mobility) for the driving transistor DRT may be performed prior to the start of display driving operation after a power-on signal is generated.

For example, when the power-on signal is applied to the display device 100, the timing controller 140 loads parameters required for driving the display panel 110 and then performs the display driving. The parameters required for driving the display panel 110 may include, for example, information regarding the sensing and compensation of the characteristic values previously performed in the display panel 110. During the loading of the parameters, the characteristic values (e.g., the threshold voltage and mobility) of the driving transistor DRT may be sensed. Such a process of sensing the characteristic values during the loading of the parameters before the subpixel emits light after the generation of the power-on signal may be referred to as an on-sensing process.

Alternatively, the sensing period of the characteristic values for the driving transistor DRT may be subsequent to the generation of a power-off signal in the display device 100. For example, when the power-off signal is generated in the display device 100, the timing controller 140 may block the supply of the data voltage to the display panel 110, and sense the characteristic values of the driving transistor DRT for a predetermined time. Such a process of sensing the characteristic values of the driving transistor DRT in a situation in which the data voltage is blocked in response to the generation of the power-off signal and thus the emission of light from the subpixel is terminated may be referred to as an off-sensing process.

In addition, the sensing period of the characteristic values for the driving transistor DRT may be in real time during the display driving. Such a sensing process may be referred to as a real-time (RT) sensing process. In the real-time sensing process, a sensing process may be performed on one or more subpixels SP in a subpixel line in every blank period during the display driving period.

That is, during the display driving period in which images are displayed on the display panel 110, a blank period in which no data voltages are supplied to the subpixels SP is present in a single frame or between a nth frame and an (n+1)th frame. In the blank period, mobility sensing operation of the one or more subpixels SP may be performed.

When the sensing process is performed in the blank period, the subpixel line in which the sensing process is performed may be randomly selected. In a line of subpixels SP on which the sensing process has been performed, flickering may occur due to a luminance difference. By randomly selecting the subpixel line as above, the luminance difference in the line of subpixels SP can be randomly controlled, and the flickering can be reduced.

In addition, after the sensing process has been performed during the blank period, it is possible to supply a compensation data voltage to a subpixel SP on which the sensing process has been performed in the display driving period. Thus, it is possible to further reduce a defect in the line of subpixels SP on which the sensing process has been completed in the display driving period after the sensing process in the blank period.

However, the process of sensing and compensating for the characteristic values of the driving transistor DRT may be effectively performed only in a normal state in which the reference voltage line RVL for detecting the sensing voltage Vsen has no defect.

When a defect, such as moisture penetration, an impurity, or a short circuit, occurs in the reference voltage line RVL, an error occurs in the sensing voltage Vsen regarding the characteristic values detected through the reference voltage line RVL. It is difficult to effectively sense or compensate for the characteristic values.

Therefore, it is required to perform a process of detecting a defect in the reference voltage line RVL before performing the sensing process of the characteristic values of the driving transistor DRT.

Figure 6:
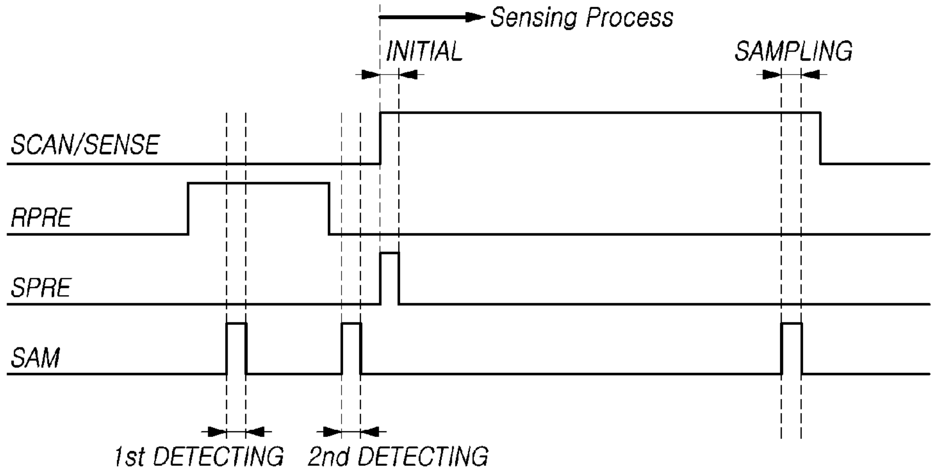
FIG. 6 is a signal flow diagram illustrating a process of detecting a defect in the reference voltage line in the display device according to aspects of the present disclosure.

FIG. 6 is a signal flow diagram illustrating a process of detecting a defect in the reference voltage line in the display device according to aspects of the present disclosure.

Referring to FIG. 6, the display device 100 according to aspects of the present disclosure may determine whether or not the reference voltage line RVL is abnormal by detecting sensing voltages Vsen on different detecting paths two or more times, prior to the sensing process for detecting the characteristic values (e.g., the threshold voltage or mobility) of the driving transistor DRT of the subpixel SP.

In this regard, the display device 100 may have a first detecting period 1st DETECTING and a second detecting period 2nd DETECTING before the sensing process for detecting the characteristic values of the driving transistor DRT is performed. In the first detecting period 1st DETECTING, a voltage on the reference voltage line RVL is detected. The path of the reference voltage Vref in the second detecting period 2nd DETECTING is different from that in the first detecting period 1st DETECTING.

The first detecting period 1st DETECTING and the second detecting period 2nd DETECTING may be performed before the sensing process for detecting the characteristic values of the driving transistor DRT is performed.

Here, the reference voltage Vref detected in the first detecting period 1st DETECTING and the second detecting period 2nd DETECTING may be the display-driving reference voltage VpreR.

Meanwhile, although the reference voltage Vref applied through the reference voltage line RVL in the first detecting period 1st DETECTING and the second detecting period 2nd DETECTING may be the display-driving reference voltage VpreR, the reference voltage Vref may be a separate defect detection voltage for detecting the defect in the reference voltage line RVL. In this case, the level of the separate defect detection voltage for detecting a defect in the reference voltage line RVL may be higher or lower than that of the display-driving reference voltage VpreR.

The first detecting period 1st DETECTING may be included in a period in which the display-driving reference voltage VpreR is applied through the reference voltage line RVL by turning on the display-driving reference switch RPRE. Here, the display-driving reference voltage VpreR is supplied to not only the analog-to-digital converter ADC through the reference voltage line RVL but also the line capacitor Cline formed on the display panel side through the reference voltage line RVL.

Thus, during the first detecting period 1st DETECTING, the analog-to-digital converter ADC can detect the display-driving reference voltage VpreR applied through the reference voltage line RVL.

The second detecting period 2nd DETECTING may be included in a period in which the display-driving reference switch RPRE is turned off after the display-driving reference voltage VpreR is applied through the reference voltage line RVL. Here, since the display-driving reference switch RPRE is in a blocked state, the analog-to-digital converter ADC may detect a voltage with which the line capacitor Cline formed on the display panel side is charged during the second detecting period 2nd DETECTING.

Thus, whether or not the reference voltage line RVL is abnormal can be determined by comparing a sensing voltage detected in the first detecting period 1st DETECTING and a sensing voltage detected in the second detecting period 2nd DETECTING.

For example, when a deviation between the sensing voltage detected in the first detecting period 1st DETECTING and the sensing voltage detected in the second detecting period 2nd DETECTING is equal to or greater than a reference value, the reference voltage line RVL may be determined to be abnormal.

When the reference voltage line RVL is determined to be abnormal, the sensing of characteristic values of the reference voltage line RVL may be stopped for a predetermined time, or the characteristic values may be the compensated for using a sensing voltage detected from an adjacent reference voltage line RVL.

Figure 7:
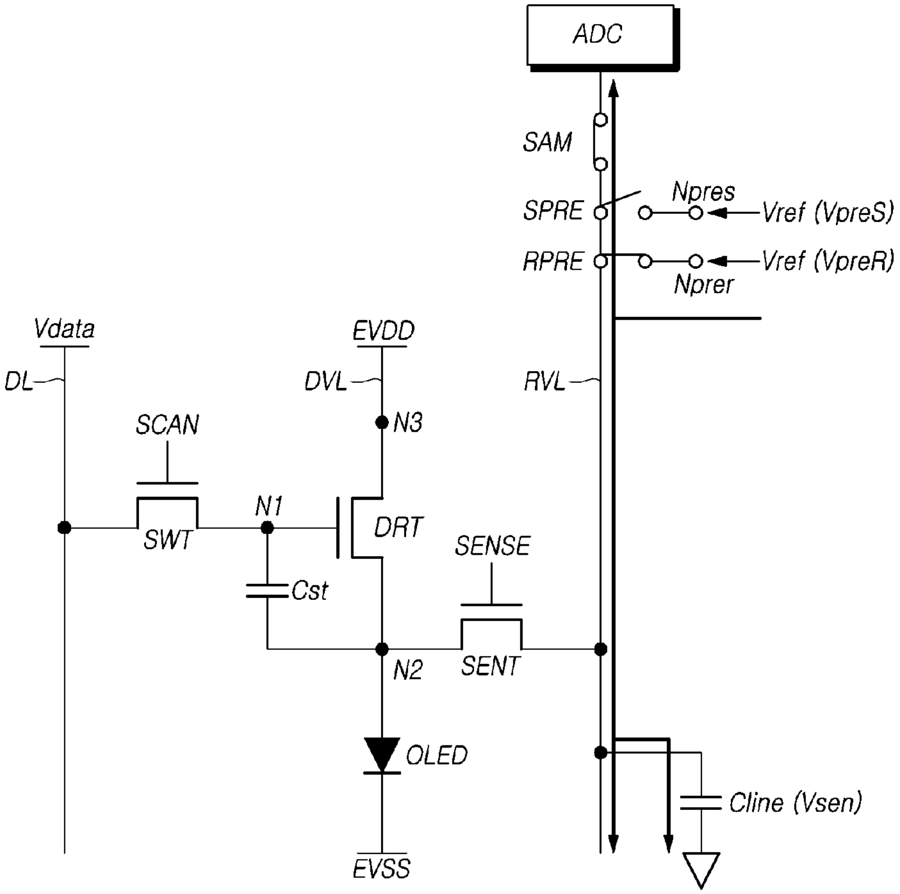
FIG. 7 illustrates a signal flow in the first detecting period in the display device according to aspects of the present disclosure.
Figure 8:
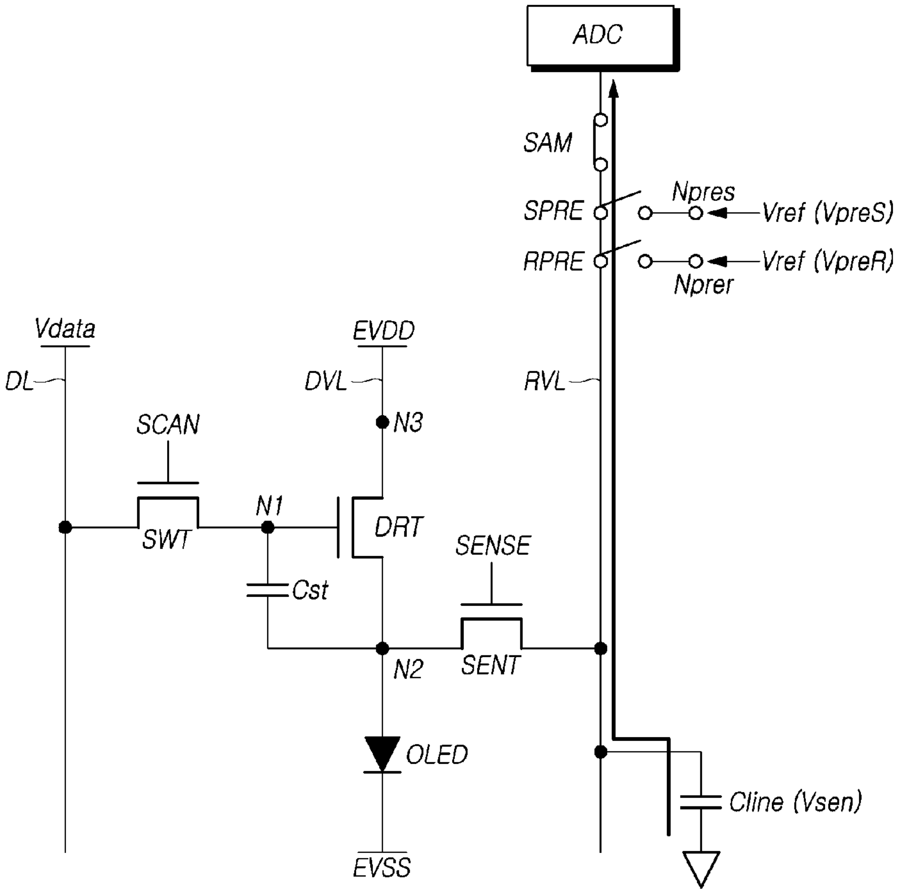
FIG. 8 illustrates a signal flow in the second detecting period in the display device according to aspects of the present disclosure.

FIG. 7 illustrates a signal flow in the first detecting period in the display device according to aspects of the present disclosure, and FIG. 8 illustrates a signal flow in the second detecting period in the display device according to aspects of the present disclosure.

Referring to FIG. 7, the first detecting period 1st DETECTING is prior to the sensing process for detecting the characteristic values of the driving transistor DRT, and is included in a period in which the display-driving reference switch RPRE is turned on and the display-driving reference voltage VpreR is supplied through the reference voltage line RVL.

Since the sampling switch SAM is turned on during the first detecting period 1st DETECTING, the display-driving reference voltage VpreR is supplied to not only the line capacitor Cline formed on the display panel side but also the analog-to-digital converter ADC through the reference voltage line RVL.

Thus, during the first detecting period 1st DETECTING, the analog-to-digital converter ADC may detect the display-driving reference voltage VpreR applied through the reference voltage line RVL.

Referring to FIG. 8, the second detecting period 2nd DETECTING is included in a period in which the display-driving reference switch RPRE is turned off after the display-driving reference voltage VpreR is applied through the reference voltage line RVL.

Since the display-driving reference switch RPRE is in a blocked state and the sampling switch SAM is in a turned-on state during the second detecting period 2nd DETECTING, the analog-to-digital converter ADC may detect a voltage with which the line capacitor Cline formed on the display panel side is charged.

Thus, in the first detecting period 1st DETECTING and the second detecting period 2nd DETECTING, sensing voltages having different detecting paths are received.

The timing controller 140 may determine whether or not the reference voltage line RVL is abnormal by receiving the sensing voltages detected in the first detecting period 1st DETECTING and the second detecting period 2nd DETECTING from the analog-to-digital converter ADC and comparing the received sensing voltages.

The timing controller 140 may determine whether or not the reference voltage line RVL is abnormal by comparing the reference value stored in the memory MEM and a deviation between the sensing voltage detected in the first detecting period 1st DETECTING and the sensing voltage detected in the second detecting period 2nd DETECTING.

When the reference voltage line RVL is determined to be abnormal through this process, the sensing of the characteristic values on the corresponding reference voltage line RVL may be stopped for a predetermined time. Alternatively, the compensation may be performed for the reference voltage line RVL determined to be abnormal using the characteristic values detected from an adjacent reference voltage line RVL.

When the deviation between the sensing voltage detected in the first detecting period 1st DETECTING and the sensing voltage detected in the second detecting period 2nd DETECTING is equal to or greater than the reference value, it may be regarded that a connection line connected to the inside of the display panel 110 or to the data driving circuit 130 is short-circuited or an impurity, such as moisture, is present.

However, regarding the defect in the reference voltage line RVL, the moisture may be evaporated or the impurity may be removed by current flowing through the reference voltage line RVL in the driving process of the display device 100. Even in the case in which a minute defect has occurred in the reference voltage line RVL due to moisture or an impurity that has penetrated into the display device 100, the defect may disappear when the moisture or the impurity is removed by heat generated by the reference voltage line RVL in the driving process of the display device 100.

Thus, in consideration that the reference voltage line RVL has a minute defect, the display device 100 according to the present disclosure may include an aging period in which the minute defect can be removed prior to the second detecting period 2nd DETECTING.

Figure 9:
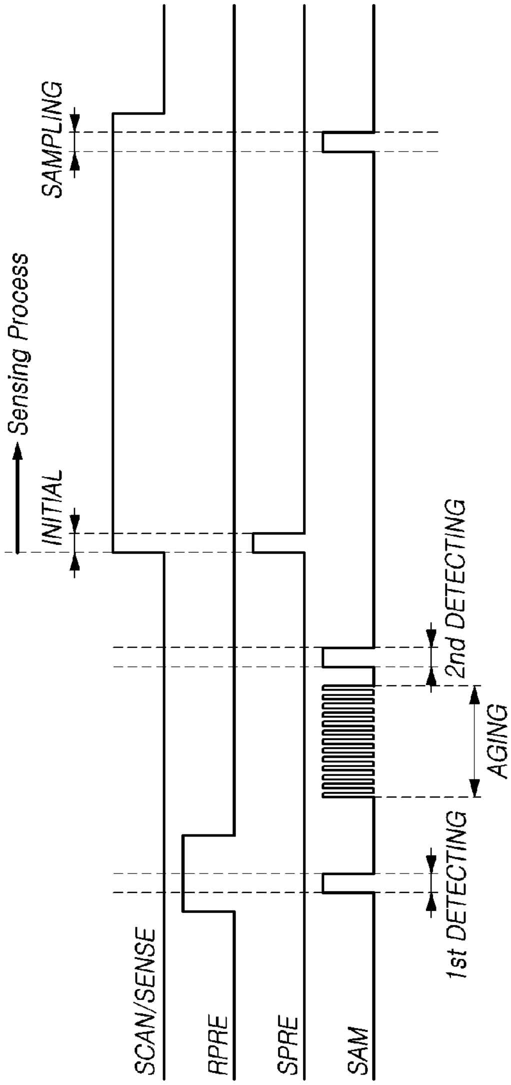
FIG. 9 is a signal flow diagram illustrating a process of determining whether or not the reference voltage line is abnormal in periods including an aging period in the display device according to aspects of the present disclosure.

FIG. 9 is a signal flow diagram illustrating a process of determining whether or not the reference voltage line is abnormal in periods including an aging period in the display device according to aspects of the present disclosure.

Referring to FIG. 9, the display device 100 according to aspects of the present disclosure may determine whether or not the reference voltage line RVL is abnormal by detecting the sensing voltage Vsen two or more times on different detecting paths, prior to the sensing process for detecting the characteristic values (e.g., the threshold voltage or mobility) of the driving transistor DRT of the subpixel SP.

Thus, the first detecting period 1st DETECTING and the second detecting period 2nd DETECTING, in each of which a voltage on the reference voltage line RVL is detected, have different paths for the reference voltage Vref. In addition, an aging period AGING in which a minute defect of the reference voltage line RVL is removable may be provided between the first detecting period 1st DETECTING and the second detecting period 2nd DETECTING.

The first detecting period 1st DETECTING, the aging period AGING, and the second detecting period 2nd DETECTING exist prior to the sensing process for detecting the characteristic values of the driving transistor DRT. Here, the reference voltage Vref detected through the reference voltage line RVL may be the display-driving reference voltage VpreR.

Meanwhile, the reference voltage Vref applied through the reference voltage line RVL in the first detecting period 1st DETECTING and the second detecting period 2nd DETECTING may be the display-driving reference voltage VpreR, and may be a separate defect detection voltage having a higher or lower level than the display-driving reference voltage VpreR in order to detect the defect in the reference voltage line RVL.

The first detecting period 1st DETECTING may be included in a period in which the display-driving reference voltage VpreR is applied through the reference voltage line RVL by turning on the display-driving reference switch RPRE. Here, the display-driving reference voltage VpreR is supplied to not only the analog-to-digital converter ADC through the reference voltage line RVL but also the line capacitor Cline formed on the display panel side through the reference voltage line RVL.

Thus, during the first detecting period 1st DETECTING, the analog-to-digital converter ADC may detect the display-driving reference voltage VpreR applied through the reference voltage line RVL.

The aging period AGING may be included in a period in which the display-driving reference switch RPRE is turned off in a state in which the line capacitor Cline is charged with the display-driving reference voltage VpreR applied through the reference voltage line RVL.

In the aging period AGING, in order to remove a minute defect caused by moisture or an impurity that has reached the reference voltage line RVL, a current flowing through the reference voltage line RVL may be transited on and off so as to generate a predetermined level of heat from the reference voltage line RVL.

In this regard, during the aging period AGING, the sampling switch SAM may be controlled to be turned on and off in an alternating manner at short time periods. For example, during the aging period AGING, the sampling switch SAM may be turned on and off three or more times at periods of several tens of microseconds. Here, the width of a pulse having repetitive turned-on and turned-off states generated by the sampling switch SAM during the aging period AGING may be smaller than the width of a pulse having repetitive turned-on and turned-off states generated by the sampling switch SAM during each of the first detecting period 1st DETECTING and the second detecting period 2nd DETECTING.

In this manner, by turning on and off the sampling switch SAM several times during the aging period AGING, transition occurs in current flowing through the reference voltage line RVL. As a result, a minute defect, such as moisture or an impurity, which has reached the reference voltage line RVL can be reduced or removed by heat generated during the transition of the current.

By starting the second detecting period 2nd DETECTING in a situation in which the defect in the reference voltage line RVL is reduced or removed through the aging period AGING, any defect in the reference voltage line RVL can be more accurately detected.

The second detecting period 2nd DETECTING may be included in a period subsequent to the termination of the aging period AGING in a situation in which the display-driving reference switch RPRE is turned off. Here, since the display-driving reference switch RPRE is blocked, during the second detecting period 2nd DETECTING, the analog-to-digital converter ADC will detect the voltage with which the line capacitor Cline formed on the display panel side is charged.

Thus, whether or not the reference voltage line RVL is abnormal can be determined by comparing the voltage sensed in the first detecting period 1st DETECTING and the voltage sensed in the second detecting period 2nd DETECTING.

For example, when the sensing voltage detected in the first detecting period 1st DETECTING and the sensing voltage detected in the second detecting period 2nd DETECTING have a deviation equal to or greater than the reference value, the reference voltage line RVL can be determined to be abnormal.

As described above, when the reference voltage line RVL is determined to be abnormal, the sensing of characteristic values of the corresponding reference voltage line RVL may be stopped for a predetermined time or the characteristic values may be the compensated for using a sensing voltage detected from an adjacent reference voltage line RVL.

Meanwhile, the aging period AGING for removing the minute defect in the reference voltage line RVL may exist prior to the first detecting period 1st DETECTING.

Figure 10:
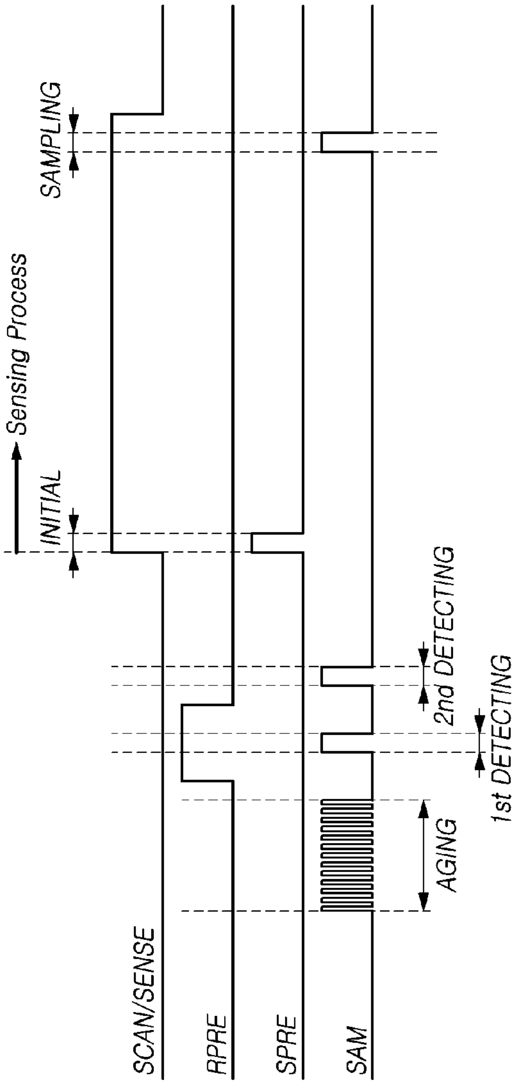
FIG. 10 is a signal flow diagram illustrating another process of determining whether or not the reference voltage line is abnormal in periods including an aging period in the display device according to aspects of the present disclosure.

FIG. 10 is a signal flow diagram illustrating another process of determining whether or not the reference voltage line is abnormal in periods including an aging period in the display device according to aspects of the present disclosure.

Referring to FIG. 10, the display device 100 according to aspects of the present disclosure may determine whether or not the reference voltage line RVL is abnormal by detecting sensing voltages Vsen on different detecting paths two or more times, prior to the sensing process for detecting the characteristic values (e.g., the threshold voltage or mobility) of the driving transistor DRT of the subpixel SP.

Thus, the first detecting period 1st DETECTING and the second detecting period 2nd DETECTING, in which voltages on the reference voltage line RVL are detected, have different paths for the reference voltage Vref.

Here, the aging period AGING in which the minute defect in the reference voltage line RVL is removable may exist prior to the first detecting period 1st DETECTING.

Here, the aging period AGING, the first detecting period 1st DETECTING, and the second detecting period 2nd DETECTING exist prior to the sensing process for detecting the characteristic values of the driving transistor DRT.

Here, the reference voltage Vref detected through the reference voltage line RVL may be the display-driving reference voltage VpreR. Meanwhile, the reference voltage Vref applied through the reference voltage line RVL in the first detecting period 1st DETECTING and the second detecting period 2nd DETECTING may be the display-driving reference voltage VpreR, and may be a separate defect detection voltage having a higher or lower level than the display-driving reference voltage VpreR in order to detect the defect in the reference voltage line RVL.

The aging period AGING may be included in a period in which the display-driving reference switch RPRE is turned off.

In the aging period AGING, in order to remove a minute defect caused by moisture or an impurity that has reached the reference voltage line RVL, a current flowing through the reference voltage line RVL may be transited on and off so as to generate a predetermined level of heat from the reference voltage line RVL.

In this regard, during the aging period AGING before the display-driving reference switch RPRE is turned on, the sampling switch SAM may be controlled to be turned on and off in an alternating manner at short time periods. For example, during the aging period AGING, the sampling switch SAM may be turned on and off three or more times at periods of several tens of microseconds. Here, the width of a pulse having repetitive turned-on and turned-off states generated by the sampling switch SAM during the aging period AGING may be smaller than the width of a pulse having repetitive turned-on and turned-off states generated by the sampling switch SAM during each of the first detecting period 1st DETECTING and the second detecting period 2nd DETECTING.

In this manner, by turning on and off the sampling switch SAM several times during the aging period AGING, transition occurs in current flowing through the reference voltage line RVL. As a result, a minute defect, such as moisture or an impurity, which has reached the reference voltage line RVL can be reduced or removed by heat generated during the transition of the current.

By starting the first detecting period 1st DETECTING and the second detecting period 2nd DETECTING starts in a situation in which the defect in the reference voltage line RVL is reduced or removed through the aging period AGING, any defect in the reference voltage line RVL can be more accurately detected.

The first detecting period 1st DETECTING may be included in a period in which the display-driving reference voltage VpreR is applied through the reference voltage line RVL by turning on the display-driving reference switch RPRE. Here, the display-driving reference voltage VpreR is supplied to not only the analog-to-digital converter ADC through the reference voltage line RVL but also the line capacitor Cline formed on the display panel side through the reference voltage line RVL.

Thus, during the first detecting period 1st DETECTING, the analog-to-digital converter ADC can detect the display-driving reference voltage VpreR applied through the reference voltage line RVL.

The second detecting period 2nd DETECTING may be included in a period in which the display-driving reference switch RPRE is turned off after the display-driving reference voltage VpreR is applied through the reference voltage line RVL. Here, since the display-driving reference switch RPRE is blocked, during the second detecting period 2nd DETECTING, the analog-to-digital converter ADC will detect the voltage with which the line capacitor Cline formed on the display panel side is charged.

Thus, whether or not the reference voltage line RVL is abnormal can be determined by comparing the voltage sensed in the first detecting period 1st DETECTING and the voltage sensed in the second detecting period 2nd DETECTING.

For example, when the sensing voltage detected in the first detecting period 1st DETECTING and the sensing voltage detected in the second detecting period 2nd DETECTING have a deviation equal to or greater than the reference value, the reference voltage line RVL can be determined to be abnormal.

When the reference voltage line RVL is determined to be abnormal through the first detecting period 1st DETECTING and the second detecting period 2nd DETECTING, the sensing of characteristic values of the corresponding reference voltage line RVL may be stopped for a predetermined time or the characteristic values may be the compensated for using a sensing voltage detected from an adjacent reference voltage line RVL.

The display device 100 according to the present disclosure may further perform offset compensation for the analog-to-digital converter ADC of the data driving circuit 130 using the sensing voltage detected through the reference voltage line RVL in the first detecting period 1st DETECTING in which the display-driving reference switch RPRE is turned on. The sensing voltage detected through the reference voltage line RVL in the first detecting period 1st DETECTING may be the display-driving reference voltage VpreR.

That is, the offset compensation for the analog-to-digital converter ADC can be performed by repeatedly detecting the display-driving reference voltage VpreR through the reference voltage line RVL to which the reference voltage Vref is applied, instead of using a separate dummy channel.

Here, for the offset compensation for the analog-to-digital converter ADC, the first detecting period 1st DETECTING in which the display-driving reference voltage VpreR is repeatedly detected may vary depending on the structure connecting the reference voltage line RVL and the subpixel SP.

Figure 11:
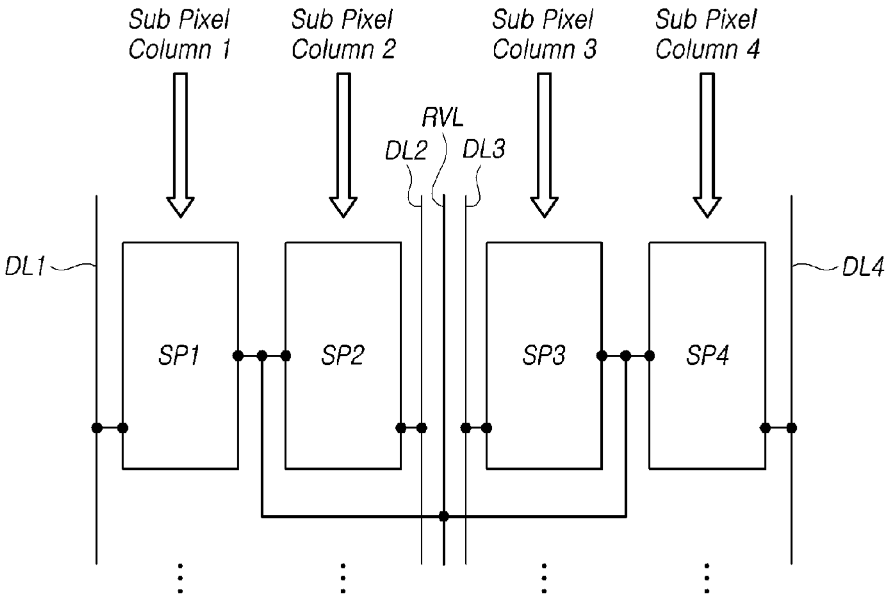
FIG. 11 illustrates a situation in which the reference voltage line is disposed with respect to 4 subpixels in the display device according to aspects of the present disclosure.

FIG. 11 illustrates a situation in which the reference voltage line is disposed with respect to 4 subpixels in the display device according to aspects of the present disclosure.

Referring to FIG. 11, in the display device 100 according to aspects of the present disclosure, the reference voltage line RVL through which the reference voltage Vref is supplied may be a signal line extending in a column direction through which the display-driving reference voltage VpreR corresponding to a common voltage is transferred in the display driving period or the sensing reference voltage VpreS is transferred in a sensing period in which the characteristic values of the driving transistor DRT are sensed.

Here, a single reference voltage line RVL may be disposed for every single column of subpixels SP, or be disposed for two or more columns of subpixels SP in order to improve driving efficiency.

Here, a situation in which a single reference voltage line RVL is disposed for every 4 columns of subpixels SP among situations in which a single reference voltage line RVL is disposed for two or more columns of subpixels SP is illustrated.

In this case, 4 subpixels SP1, SP2, SP3, and SP4 may be subpixels SP provided in four columns of subpixels SP while being in a single row of subpixels SP. Here, the 4 subpixels SP1, SP2, SP3, and SP4 may be, for example, a subpixel emitting red light, a subpixel emitting white light, a subpixel emitting green light, and a subpixel emitting blue light, respectively.

The 4 subpixels SP1, SP2, SP3, and SP4 are electrically connected to 4 data lines DL1, DL2, DL3, and DL4, respectively, in a corresponding manner. In addition, the 4 subpixels SP1, SP2, SP3, and SP4 may be connected in common to a single reference voltage line RVL. That is, the single reference voltage line RVL may be shared by the 4 subpixels SP1, SP2, SP3, and SP4.

In this case, the reference voltage Vref may be applied in common to driving transistors DRT corresponding to the 4 subpixels SP1, SP2, SP3, and SP4 through a single reference voltage line RVL.

As described above, the color of subpixels SP of each pixel is not limited to white, red, green, and blue. The color or position of the subpixels SP may be variously changed depending on the type of the display device 100.

With increases in the resolution of the display device 100, the distances among the subpixels SP are reduced, and the distances among the data lines DL, through which the data voltage Vdata is supplied to the subpixels SP, and the reference voltage lines RVL are reduced.

Figure 12:
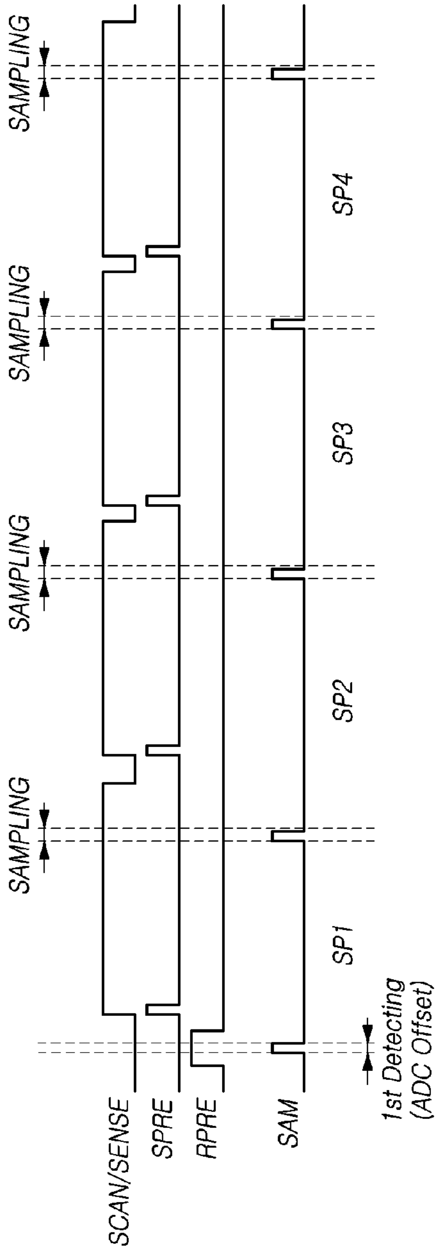
FIG. 12 is a signal flow diagram illustrating an offset correction process of the analog-to-digital converter for a situation in which a single reference voltage line is disposed for every 4 subpixel columns in the display device according to aspects of the present disclosure.

FIG. 12 is a signal flow diagram illustrating an offset correction process of the analog-to-digital converter for a situation in which a single reference voltage line is disposed for every 4 subpixel columns in the display device according to aspects of the present disclosure.

Referring to FIG. 12, the display device 100 according to aspects of the present disclosure may correct the offset of the analog-to-digital converter ADC by repeatedly detecting the display-driving reference voltage VpreR through the reference voltage line RVL to which the reference voltage Vref is applied during the first detecting period 1st DETECTING.

The first detecting period 1st DETECTING may be included in a period in which the display-driving reference voltage VpreR is applied through the reference voltage line RVL by turning on the display-driving reference switch RPRE.

Here, the display-driving reference voltage VpreR is supplied to the analog-to-digital converter ADC through the reference voltage line RVL. Thus, during the first detecting period 1st DETECTING, the analog-to-digital converter ADC may detect the display-driving reference voltage VpreR applied through the reference voltage line RVL.

Here, in a structure in which a single reference voltage line is disposed for every 4 subpixel columns, the first detecting period 1st DETECTING in which the display-driving reference voltage VpreR applied through the reference voltage line RVL is detected may include a single first detecting period 1st DETECTING while the characteristic values of the 4 subpixels SP1, SP2, SP3, and SP4 are being sensed through the reference voltage line RVL.

Here, the offset of the analog-to-digital converter ADC of the data driving circuit 130 may be corrected by reflecting a deviation of the sensing voltage Vsen detected through the first detecting period 1st DETECTING. In this regard, a plurality of first detecting periods 1st DETECTING may be repeated in order to correct the offset of the analog-to-digital converter ADC.

That is, in a situation in which a single reference voltage line is disposed for every 4 subpixel columns, a single first detecting period 1st DETECTING is included in a time period in which the characteristic values of the 4 subpixels SP1, SP2, SP3, and SP4 are sensed. Thus, while the time period in which the characteristic values of the 4 subpixels SP1, SP2, SP3, and SP4 are sensed is being repeated several times, the display-driving reference voltage VpreR may be detected several times through the first detecting period 1st DETECTING.

Here, the display-driving reference voltage VpreR applied through the reference voltage line RVL has the same value. Thus, when there is a deviation in a plurality of sensing voltages Vsen detected through a plurality of first detecting periods 1st DETECTING, the analog-to-digital converter ADC may be determined to have an offset matching the deviation.

As a result, the offset of the analog-to-digital converter ADC can be corrected by the deviation of the plurality of sensing voltages Vsen detected through the plurality of first detecting periods 1st DETECTING.

Figure 13:
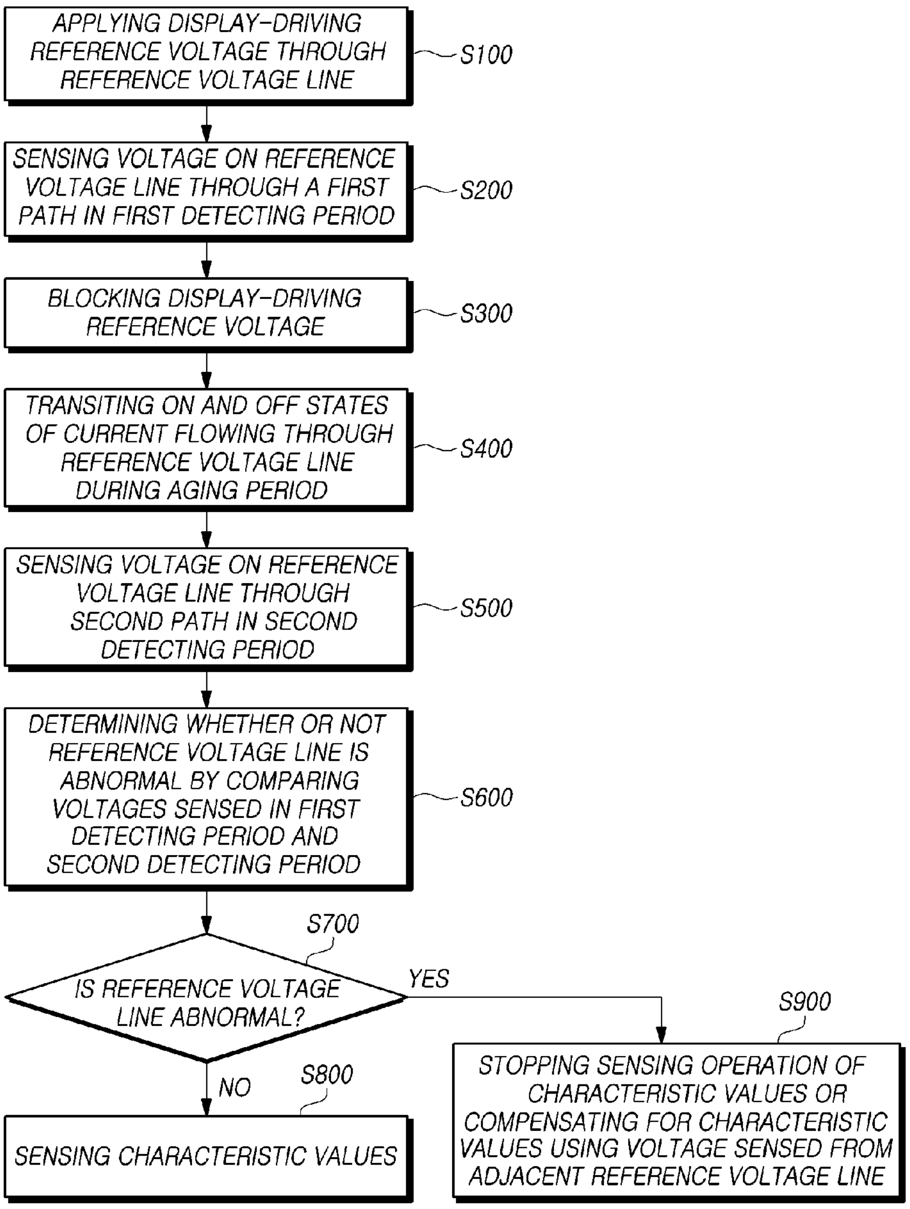
FIG. 13 is a flowchart illustrating a display driving method according to aspects of the present disclosure.

FIG. 13 is a flowchart illustrating a display driving method according to aspects of the present disclosure.

Referring to FIG. 13, the display driving method according to aspects of the present disclosure may include: a step S100 of applying a display-driving reference voltage VpreR through a reference voltage line RVL; a step S200 of sensing a voltage on the reference voltage line RVL through a first path in a first detecting period 1st DETECTING; a step S300 of blocking the display-driving reference voltage VpreR; a step S400 of transiting on and off states of a current flowing through the reference voltage line RVL during an aging period AGING; an operation S500 of sensing a voltage on the reference voltage line RVL through a second path in a second detecting period 2nd DETECTING; an operation S600 of determining whether or not the reference voltage line RVL is abnormal by comparing the voltage sensed in the first detecting period 1st DETECTING and the voltage sensed in the second detecting period 2nd DETECTING; a step S800 of sensing characteristic values when the reference voltage line RVL is not abnormal; and a step S900 of stopping the sensing operation of the characteristic values or compensating for the characteristic values using a voltage sensed from an adjacent reference voltage line RVL when the reference voltage line RVL is abnormal.

The step S100 of applying the display-driving reference voltage VpreR through the reference voltage line RVL is an operation of applying the display-driving reference voltage VpreR through the reference voltage line RVL by turning on the display-driving reference switch RPRE.

The step S200 of sensing the voltage on the reference voltage line RVL through the first path in the first detecting period 1st DETECTING is an operation of sensing the display-driving reference voltage VpreR through the reference voltage line RVL by the analog-to-digital converter ADC disposed in the data driving circuit 130 in a situation in which the display-driving reference switch RPRE is turned on.

The step S300 of blocking the display-driving reference voltage VpreR is an operation of blocking the display-driving reference voltage VpreR that has been applied through the reference voltage line RVL by turning off the display-driving reference switch RPRE.

The step S400 of transiting the on and off states of the current flowing through the reference voltage line RVL during the aging period AGING is an operation of transiting the on and off states of the current flowing through the reference voltage line RVL so that a predetermined level of heat may be generated from the reference voltage line RVL in order to remove a minute defect caused by moisture or an impurity that has reached the reference voltage line RVL.

Meanwhile, herein, the aging period AGING has been illustrated as being subsequent to the first detecting period 1st DETECTING, but the aging period AGING may exist prior to the first detecting period 1st DETECTING.

The step S500 of sensing the voltage on the reference voltage line RVL through the second path in the second detecting period 2nd DETECTING is an operation of detecting the voltage, with which the line capacitor Cline formed on the reference voltage line RVL is charged, through the reference voltage line RVL in a situation in which the display-driving reference switch RPRE is turned off.

The step S600 of determining whether or not the reference voltage line RVL is abnormal by comparing the voltages sensed in the first detecting period 1st DETECTING and the second detecting period 2nd DETECTING is an operation of comparing the display-driving reference voltage VpreR sensed in the first detecting period 1st DETECTING and the voltage of the line capacitor Cline sensed in the second detecting period 2nd DETECTING.

The step S800 of sensing the characteristic values when the reference voltage line RVL is determined to not be abnormal is an operation of sensing and compensating for the characteristic values of the driving transistor DRT of the subpixel SP through the reference voltage line RVL.

The step S900 of stopping the sensing operation of the characteristic values or compensating for the characteristic values using a voltage sensed from an adjacent reference voltage line RVL when the reference voltage line RVL is abnormal is a process of stopping the sensing operation of the characteristic values through the reference voltage line RVL or compensating for the characteristic values using the voltage sensed from the adjacent reference voltage line RVL when the reference voltage line RVL is determined to be abnormal.

The foregoing aspects of the present disclosure will be briefly described as follows.

The display device 100 according to aspects includes: a display panel 110 in which a plurality of gate lines GL to which a scan signal SCAN is applied, a plurality of data lines DL to which a data voltage Vdata is applied, a plurality of reference voltage lines RVL to which a reference voltage Vref is applied, and a plurality of subpixels SP are disposed; a data driving circuit 130 configured to sense a voltage on one reference voltage line RVL selected from the plurality of reference voltage lines RVL in a first detecting period 1st DETECTING and a second detecting period 2nd DETECTING having different voltage detecting paths; and a timing controller 140 configured to control the data driving circuit 130, and determine whether or not the reference voltage line RVL is abnormal using a sensing voltage Vsen detected from the reference voltage line RVL.

The voltage detecting paths may include a first path on which a display-driving reference voltage VpreR is applied to the reference voltage line RVL and a second path on which a voltage from a line capacitor Cline charged with the display-driving reference voltage VpreR is transferred to the reference voltage line RVL.

The first detecting period 1st DETECTING may be included in a period in which the display-driving reference voltage VpreR is applied through the reference voltage line RVL by turning on a display-driving reference switch RPRE.

The second detecting period 2nd DETECTING may be included in a period in which the display-driving reference switch RPRE is turned off after the display-driving reference voltage VpreR is applied through the reference voltage line RVL.

The display device 100 according to aspects may further include an aging period AGING in which on and off states of a current flowing through the reference voltage line RVL are transited so that a predetermined level of heat is generated from the reference voltage line RVL.

In the aging period AGING, a sampling switch SAM connected to the reference voltage line RVL may be repeatedly turned on and off three or more times.

The width of a pulse having repetitive turned-on and turned-off states generated by the sampling switch SAM connected to the reference voltage line RVL during the aging period AGING may be smaller than the width of a pulse having repetitive turned-on and turned-off states generated by the sampling switch SAM during each of the first detecting period 1st DETECTING and the second detecting period 2nd DETECTING.

The aging period AGING may be included in a period in which the display-driving reference switch RPRE is turned off in a situation in which the display-driving reference voltage VpreR is applied through the reference voltage line RVL.

The aging period AGING may exist prior to the first detecting period 1st DETECTING, or exist prior to the second detecting period 2nd DETECTING.

The data driving circuit 130 may detect the sensing voltage Vsen by an analog-to-digital converter ADC connected to the reference voltage line RVL.

The timing controller 140 may correct an offset of the analog-to-digital converter ADC by reflecting a deviation of the sensing voltage Vsen in the first detecting period 1st DETECTING repeated a plurality of times.

When the reference voltage line RVL is determined to be abnormal, the timing controller 140 may stop sensing characteristic values of a corresponding reference voltage line RVL among the plurality of reference voltage lines RVL or compensate for the characteristic values using the sensing voltage Vsen detected from an adjacent reference voltage line RVL among the plurality of reference voltage lines RVL.

A voltage applied to the reference voltage line RVL in the first detecting period 1st DETECTING may be a defect detection voltage having a different level from the display-driving reference voltage VpreR.

The data driving circuit 130 according to aspects may include: an analog-to-digital converter ADC configured to sense a voltage on a reference voltage line RVL electrically connected to a source node of a driving transistor DRT disposed in a display panel 110 in a first detecting period 1st DETECTING and a second detecting period 2nd DETECTING having different voltage detecting paths; a data output circuit 136 configured to convert digital image data DATA transferred through a timing controller 140 to an analog data voltage Vdata, and supply the analog data voltage Vdata to a corresponding subpixel SP through a plurality of data lines DL; and a sampling switch SAM configured to control on and off states of the reference voltage line RVL.

The first detecting period 1st DETECTING may be included in a period in which the display-driving reference voltage VpreR is applied through the reference voltage line RVL by turning on the display-driving reference switch RPRE, and the second detecting period 2nd DETECTING may be included in a period in which the display-driving reference switch RPRE is turned off after the display-driving reference voltage VpreR is applied through the reference voltage line RVL.

The data driving circuit 130 according to aspects may further include an aging period AGING in which the sampling switch SAM is turned on and off for a predetermined time so that a predetermined level of heat is generated from the reference voltage line RVL.

The aging period AGING may be included in a period in which the display-driving reference switch RPRE is turned off.

The display driving method according to aspects is a method of driving a display device 100 including a plurality of data lines DL extending to a display panel 110 in which a plurality of subpixels SP are disposed to supply a data voltage Vdata and a reference voltage line RVL electrically connected to a source node of a driving transistor DRT disposed in the display panel 110. The method may include: applying a display-driving reference voltage VpreR to the reference voltage line RVL; sensing a voltage on the reference voltage line RVL through a first path in a first detecting period 1st DETECTING; blocking the display-driving reference voltage VpreR; sensing a voltage on the reference voltage line RVL through a second path in a second detecting period 2nd DETECTING; determining whether or not the reference voltage line RVL is abnormal by comparing the voltage sensed in the first detecting period 1st DETECTING and the voltage sensed in the second detecting period 2nd DETECTING; sensing characteristic values when the reference voltage line RVL is not abnormal; and when the reference voltage line RVL is abnormal, stopping the sensing of the characteristic values or compensating for the characteristic values using a voltage sensed from an adjacent reference voltage line RVL.

The display driving method according to aspects may further include an operation of transiting on and off states of a current flowing through the reference voltage line RVL during an aging period AGING.

The aging period AGING may exist prior to the first detecting period 1st DETECTING, or exist prior to the second detecting period 2nd DETECTING.

The display driving method according to aspects may further include an operation of correcting an offset of the analog-to-digital converter ADC disposed in the data driving circuit 130 by reflecting a deviation of sensing voltages in the first detecting period 1st DETECTING repeated a plurality of times.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:

a display panel in which a plurality of gate lines to which a scan signal is applied, a plurality of data lines to which a data voltage is applied, a plurality of reference voltage lines to which a reference voltage is applied, and a plurality of subpixels are disposed;

a data driving circuit configured to sense a voltage on one reference voltage line selected from the plurality of reference voltage lines through a first path during a first detecting period and through a second path during a second detecting period before performing a sensing operation of a characteristic value of a driving transistor disposed in the display panel; and a timing controller configured to control the data driving circuit, to transit on and off states of a current flowing through the reference voltage line during an aging period so that a predetermined level of heat is generated from the reference voltage line, and to determine whether or not the reference voltage line is abnormal using sensing voltages detected from the reference voltage line during the first detecting period and the second detecting period.

2. The display device of claim 1, wherein the first path is a path on which a display-driving reference voltage is applied to the reference voltage line and the second path is a path on which a voltage from a line capacitor charged with the display-driving reference voltage is transferred to the reference voltage line.

3. The display device of claim 2, wherein the first detecting period is included in a period in which the display-driving reference voltage is applied through the reference voltage line by turning on a display-driving reference switch.

4. The display device of claim 3, wherein the second detecting period is included in a period in which the display-driving reference switch is turned off after the display-driving reference voltage is applied through the reference voltage line.

5. The display device of claim 1, further comprising a sampling switch connected to the reference voltage line is repeatedly turned on and off three or more times during the aging period.

6. The display device of claim 1, wherein a width of a pulse having repetitive turned-on and turned-off states generated by a sampling switch connected to the reference voltage line during the aging period is smaller than the width of a pulse having repetitive turned-on and turned-off states generated by the sampling switch during each of the first detecting period and the second detecting period.

7. The display device of claim 1, wherein the aging period is included in a period in which a display-driving reference switch is turned off in a situation in which a display-driving reference voltage is applied through the reference voltage line.

8. The display device of claim 1, wherein the aging period exists prior to the first detecting period or the second detecting period.

9. The display device of claim 1, wherein the data driving circuit detects the sensing voltage by an analog-to-digital converter connected to the reference voltage line.

10. The display device of claim 9, wherein the timing controller corrects an offset of the analog-to-digital converter by reflecting a deviation of the sensing voltage in the first detecting period repeated a plurality of times.

11. The display device of claim 1, wherein, when the reference voltage line is determined to be abnormal, the timing controller stops the sensing operation of a characteristic value for a corresponding reference voltage line among the plurality of reference voltage lines or compensates for the characteristic value using the sensing voltage detected from an adjacent reference voltage line among the plurality of reference voltage lines.

12. The display device of claim 1, wherein a voltage applied to the reference voltage line during the first detecting period is a defect detection voltage having a different level from a display-driving reference voltage.

13. A data driving circuit comprising:

an analog-to-digital converter configured to sense a voltage on a reference voltage line electrically connected to a source node of a driving transistor disposed in a display panel through a first path during a first detecting period and through a second path during a second detecting period before performing a sensing operation of a characteristic value of the driving transistor;

a data output circuit configured to convert digital image data transferred through a timing controller to an analog data voltage, and supply the analog data voltage to a corresponding subpixel through a plurality of data lines; and a sampling switch configured to control on and off states of the reference voltage line for a predetermined time in an aging period so that a predetermined level of heat is generated from the reference voltage line.

14. The data driving circuit of claim 13, wherein the first detecting period is included in a period in which a display-driving reference voltage is applied through the reference voltage line by turning on a display-driving reference switch, and wherein the second detecting period is included in a period in which the display-driving reference switch is turned off after the display-driving reference voltage is applied through the reference voltage line.

15. The data driving circuit of claim 13, wherein the aging period is included in a period in which a display-driving reference switch is turned off.

16. A display driving method of a display device, wherein the display device includes a plurality of data lines extending to a display panel in which a plurality of subpixels are disposed to supply a data voltage and a reference voltage line electrically connected to a source node of a driving transistor disposed in the display panel, the display driving method comprising:

applying a display-driving reference voltage to the reference voltage line;

sensing a voltage on the reference voltage line through a first path during a first detecting period before performing a sensing operation of a characteristic value of the driving transistor;

blocking the display-driving reference voltage;

transiting on and off states of a current flowing through the reference voltage line during an aging period;

sensing a voltage on the reference voltage line through a second path during a second detecting period before performing a sensing operation of a characteristic value of the driving transistor;

determining whether or not the reference voltage line is abnormal by comparing the voltage sensed during the first detecting period and the voltage sensed during the second detecting period;

sensing a characteristic value of the driving transistor when the reference voltage line is not abnormal; and stopping the sensing operation of the characteristic value or compensating for the characteristic value using a voltage sensed from an adjacent reference voltage line when the reference voltage line is abnormal.

17. The display driving method of claim 16, further comprising correcting an offset of an analog-to-digital converter disposed in a data driving circuit of the display device by reflecting a deviation of sensing voltages in the first detecting period repeated a plurality of times.

* * * * *